United States Patent Office 2,754,476
Patented July 10, 1956

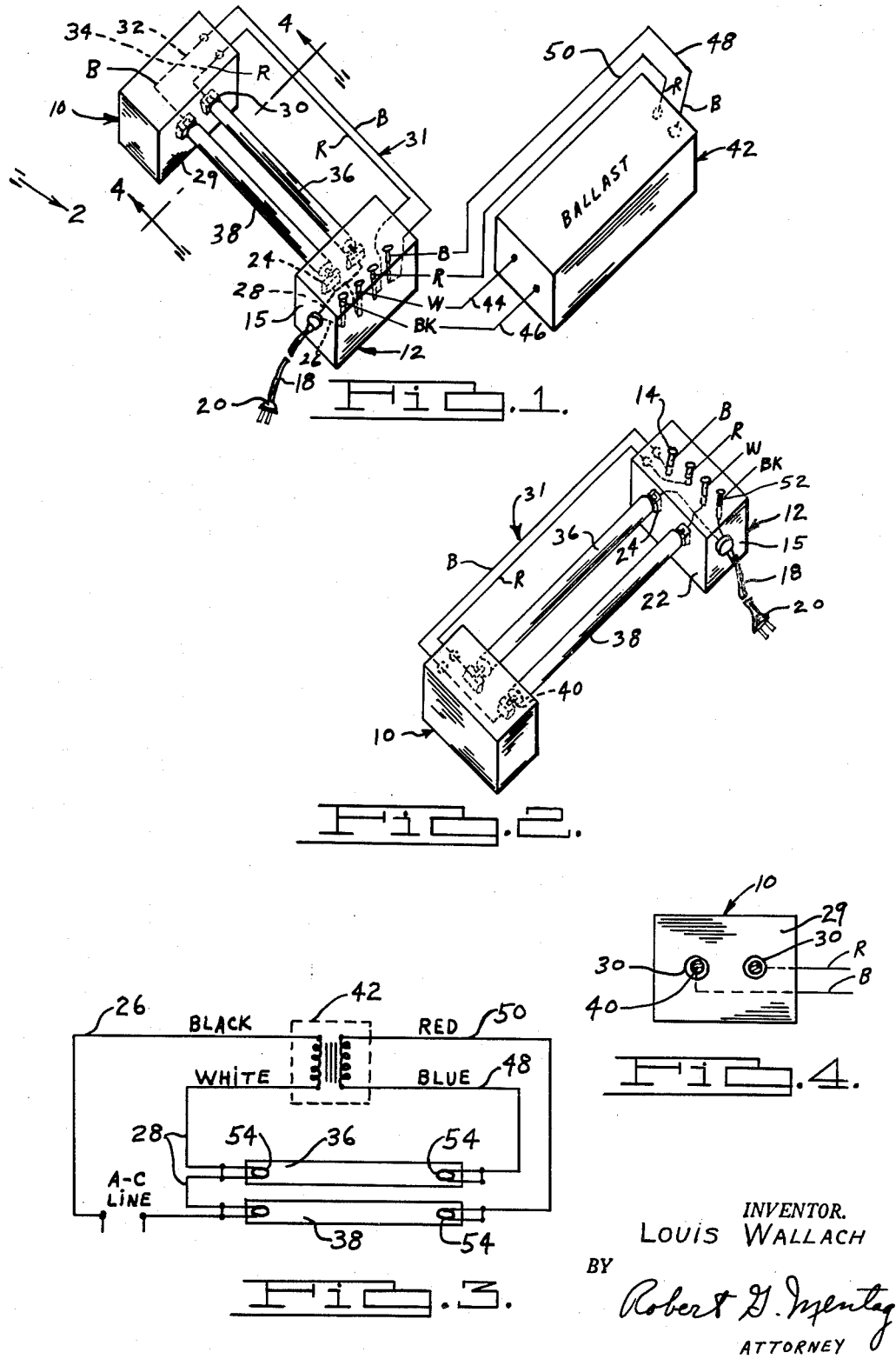

2,754,476

TESTING UNIT FOR SLIMLINE LAMPS AND BALLASTS THEREFOR

Louis Wallach, Detroit, Mich.

Application May 11, 1955, Serial No. 507,557

4 Claims. (Cl. 324—23)

This invention relates generally to electrical testing apparatus, and, more particularly, to an electrical testing unit especially adapted for testing ballasts used with electric gaseous lamps popularly known as Slimline lamps, and for testing the slimline lamps themselves.

The use of instant start type fluorescent lamps, for industrial, commercial and domestic lighting purposes has increased extensively in the past few years. This type of fluorescent lamp is known in the art as the Slimline lamp, and, it does not require a starter because it is designed to start by means of a high starting voltage and to operate on a normal operating voltage after the lamp is started. The high starting voltage is delivered by a special instant-start ballast. In the field, when trouble occurs with a lamp of this type, it is common practice with many servicemen to merely substitute a new ballast and/or tubes, and send the ballast or transformer back to the replacement shop for testing. In many instances, these ballasts have tested out to be good and operable, and, accordingly, they were unnecessarily sent back to the replacement shop. It has been found, that such occurrences are frequent in this field, and that they result in unnecessary expenditures for extra ballasts. Accordingly, it is the primary object of this invention to provide a small, compact and portable testing unit which is adapted for testing Slimline ballasts in the field, at the point of use, and, which is also adapted for testing the Slimline lamps.

It is an object of this invention to provide a testing unit for testing Slimline ballasts and lamps which is simple in construction, economical of manufacture, and efficient in use.

It is another object of this invention to provide a testing unit for testing Slimline ballasts and lamps which requires no electrical knowledge on the part of the operator, and, which can be efficiently used by an operator with a minimum of instruction.

It is a further object of this invention to provide a testing unit for testing Slimline lamps of varying lengths, and, which is also capable of being adapted for testing ballasts of varying ratings.

It is a still further object of this invention to provide a testing unit for testing Slimline ballasts and lamps, which includes a first housing provided with a plurality of lampholders and a plurality of connector posts adapted for connection to the leads of a ballast, a second housing provided with a plurality of lampholders, and a suitable electrical circuit means connecting said lampholders and connector posts.

Other objects, features and advantages of this invention will be apparent from the following detailed description and the appended claims, reference being had to the accompanying drawing forming a part of the specification, wherein like reference numerals designate corresponding parts of the several views.

In the drawing:

Fig. 1 is a perspective view of an illustrative embodiment of the invention;

Fig. 2 is a perspective view of the structure illustrated in Fig. 1, taken in the direction of the arrow 2;

Fig. 3 is a schematic circuit diagram of the testing unit of the invention; and, Fig. 4 is an elevational view of the structure illustrated in Fig. 1, taken along the line 4—4 thereof.

Before explaining in detail the present invention, it is to be understood, that the invention is not limited in its application to the details of construction and arrangement of parts illustrated in the accompanying drawing, since the invention is capable of other embodiments and of being practiced or carried out in various ways. Also, it is to be understood, that the phraseology and terminology employed herein is for the purpose of description and not limitation.

In the drawing, the illustrative embodiment comprises a first housing 10 and a second housing 12, which may be made of suitable metal, wood or a plastic material, for housing in their interiors the electrical circuits of the testing unit. As is best seen in Figs. 1 and 2, the housing 12 is provided with a plurality of vertically disposed connector posts, as 14. These connector posts are preferably mounted in the upper part of the housing 12 and are marked with the letters R, B, W and BK, to indicate that, the Red, Blue, White and Black lead lines from the ballast to be tested, should be connected to these connector posts, respectively.

Fixedly mounted on the end 15 of the housing 12 is a fitting to which is secured a cord 18 having a connection plug 20 on the end thereof, which is adapted to be inserted in the conventional wall socket. The housing 12 is provided on the side 22 thereof, with a pair of low-voltage Slimline lampholders 24 which are laterally spaced apart. As shown in Fig. 1, the black line 26 of the line 18 is connected to the inner end of the Black connector post 14. The white line 28 is connected to both of the lampholders 24, and, thence is connected to the inner end of the connector post marked W.

The housing 10 is provided on the inner side 29 thereof, with a pair of high-voltage Slimline lampholders 30, which are fixedly mounted thereon, in spaced apart relation. As is shown in Fig. 1, a flexible two-conductor cord 31 is provided to interconnect the housings 10 and 12. One of the conductors in cord 31 is connected to the connector post B in the housing 12, and to the front lampholder 30 in housing 10, and this conductor is marked with the numeral 32. The other conductor 34, in the cord 31, is connected to the connector post R in the housing 12, and to the rear lampholder 30 in the housing 10. As shown in Fig. 1, a pair of Slimline lamps 36 and 38 are mounted between the housings 10 and 12 with their single-pin base parts seated in the rear and front, respectively, pairs of lampholders 24 and 30. The single-pin base parts of these lamps are indicated by the numeral 40.

The ballast or transformer to be tested is indicated by the numeral 42, and is provided with a pair of primary leads 44 and 46. The lead 44 is the White lead and is connectable to the connector post W. The lead 46 is the Black lead and is connectable to the connector post BK. The secondary leads of the ballast 42 are marked by the numerals 48 and 50. The lead 48 is the Blue lead and is connectable to the connector post B. The lead 50 is the Red lead and is connectable to the connector post R. The connector posts 14 may be of any suitable type and construction, as for example, the post could be provided with a transverse hole as 52 into which the leads 44, 46, 48 and 50 are slipped and held therein, by friction, spring or screw means. The Slimline lamps 36 and 38, and the lampholders therefor, 24 and 30, are conventional equipment, and, the cathodes 54 of these lamps are of the single pin base connection type, since no preheating circuit is needed.

In operation, the two housings 10 and 12 may be easily packed in a small compact unit for carrying purposes. When the user has arrived at the scene of the lighting fixture giving trouble, the housings 10 and 12 may be easily and quickly spread apart and disposed for action. A pair of known good Slimline lamps as 36 and 38 are placed in the sockets and the testing unit is ready for use. The ballast, as 42, is then removed from the fixture and the lead lines therefore are connected to the connector posts 14, by the color arrangement shown in the drawing. The testing unit is now ready for operation, and the testing step may be carried out, by merely inserting the plug 29 into a suitable 110–120 volt alternating current power supply wall outlet, or the like. If the ballast is good and operable, the lamps 36 and 38 will function, and, if the ballast is bad, the lamps will not light up. It will be seen, that the instant testing unit provides a quick and easy means for testing a Slimline ballast in the field.

The instant testing unit may also be used for testing Slimline lamps, by merely connecting a known good ballast 42, and inserting the lamps to be tested in the lampholders. If desired, the conductor line 18 may be provided with a switch. It will be understood, that the instant testing unit may be modified to test a ballast for one or three Slimline lamps by adding another set of lampholders and connector posts, as needed. It will be also understood, that the flexible interconnecting cord 31 may be made as long as desired, in order to test the length lamps desired.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. A testing unit of the class described, comprising: a first housing provided with a plurality of lampholders; a second housing provided with a plurality of lampholders; circuit means connecting the lampholders in said second housing to a plurality of connector posts in said second housing; a flexible electrical conductor connecting the lampholders in said first housing with a plurality of connector posts in said second housing; electrical conductor means connected to the lampholders in said second housing, and to one of said connector posts, for connecting the testing unit to a source of electrical power; and, said connector posts being adapted to releasably hold the ends of the ballast leads of the ballast to be tested.

2. A testing unit of the class described, comprising: a first box-like housing provided with a pair of lampholders on one side thereof; a second box-like housing provided with a pair of lampholders on one side thereof; said housings being adapted to be disposed so that said pairs of lampholders are facing each other; a first pair of connector posts fixedly mounted in said second box-like housing and having a portion thereof extending upwardly from said housing; a conductor connecting one of said connector posts to one of said lampholders in said first housing; another conductor connecting the other of said connector posts to the other of said lampholders in said first housing; said conductors being flexible to permit said housings to be spaced varying distances apart; a second pair of connector posts fixedly mounted in said second box-like housing and having a portion thereof extending upwardly from said housing; a two-conductor flexible cord mounted in said second housing and adapted to be connected to a source of electrical power; one of the conductors of said cord being connected to one of said connector posts in said second pair of connector posts, and to said lampholders in said second housing; and, said connector posts being provided with means for having releasably connected thereto, the leads of a ballast for testing thereof when a pair of known good lamps are mounted in said lampholders.

3. The invention as set forth in claim 2, wherein: said first pair of connector posts are marked red and blue and are adapted to be connected to the red and blue secondary leads from the ballast to be tested; and, said second pair of connector posts are marked with white and black colors and are adapted to be connected to the white and black primary leads from the ballast to be tested.

4. In a testing unit of the class described, the combination of: a pair of spaced apart housings; each of said housings being provided with a plurality of lampholders; a plurality of lamps mounted between said housings, with one end of the lamps mounted in the lampholders in one housing and other end of the lamps mounted in the lampholders in the other housing; a plurality of connector posts mounted in one of said housings; some of said connector posts being connected by circuit means with the lampholders in the other of said housings, and the other of said connector posts being connected by circuit means with the lampholders in the housing supporting the connector posts; means for connecting said other connector posts to a source of electrical power; and said connector posts being provided with means on the outer ends thereof for being releasably connected to the leads of a ballast to be tested.

References Cited in the file of this patent

UNITED STATES PATENTS

| 2,233,646 | Smith | Mar. 4, 1941 |
| 2,243,755 | James | May 27, 1941 |
| 2,415,502 | Lifshitz | Feb. 11, 1947 |